Dec. 29, 1953   L. T. DAVIES   2,664,277
CEMENT MIXER
Filed May 28, 1952   3 Sheets-Sheet 1
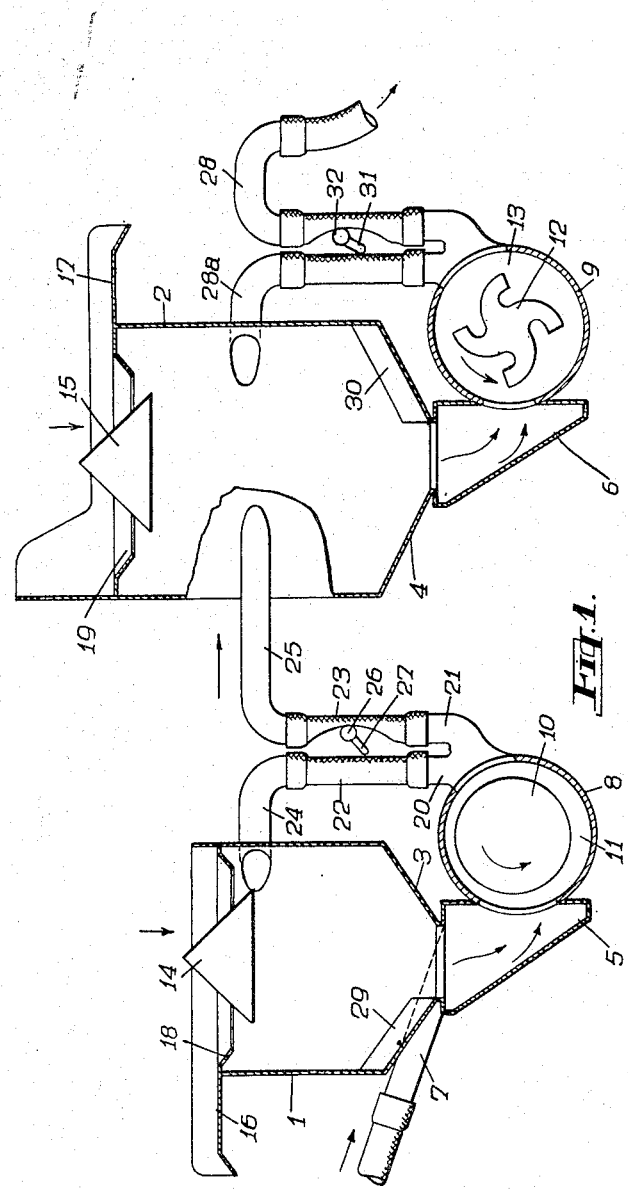
L. T. Davies
Inventor
By
Mason, Porter, Miller & Stewart
Attorneys Dec. 29, 1953　　　　　　　　　L. T. DAVIES　　　　　　　　　2,664,277
CEMENT MIXER Filed May 28, 1952　　　　　　　　　　　　　　　　　　3 Sheets-Sheet 2

L. T. Davies
Inventor

By Mason, Porter, Miller & Stewart
Attorneys

Dec. 29, 1953  L. T. DAVIES  2,664,277
CEMENT MIXER
Filed May 28, 1952  3 Sheets-Sheet 3
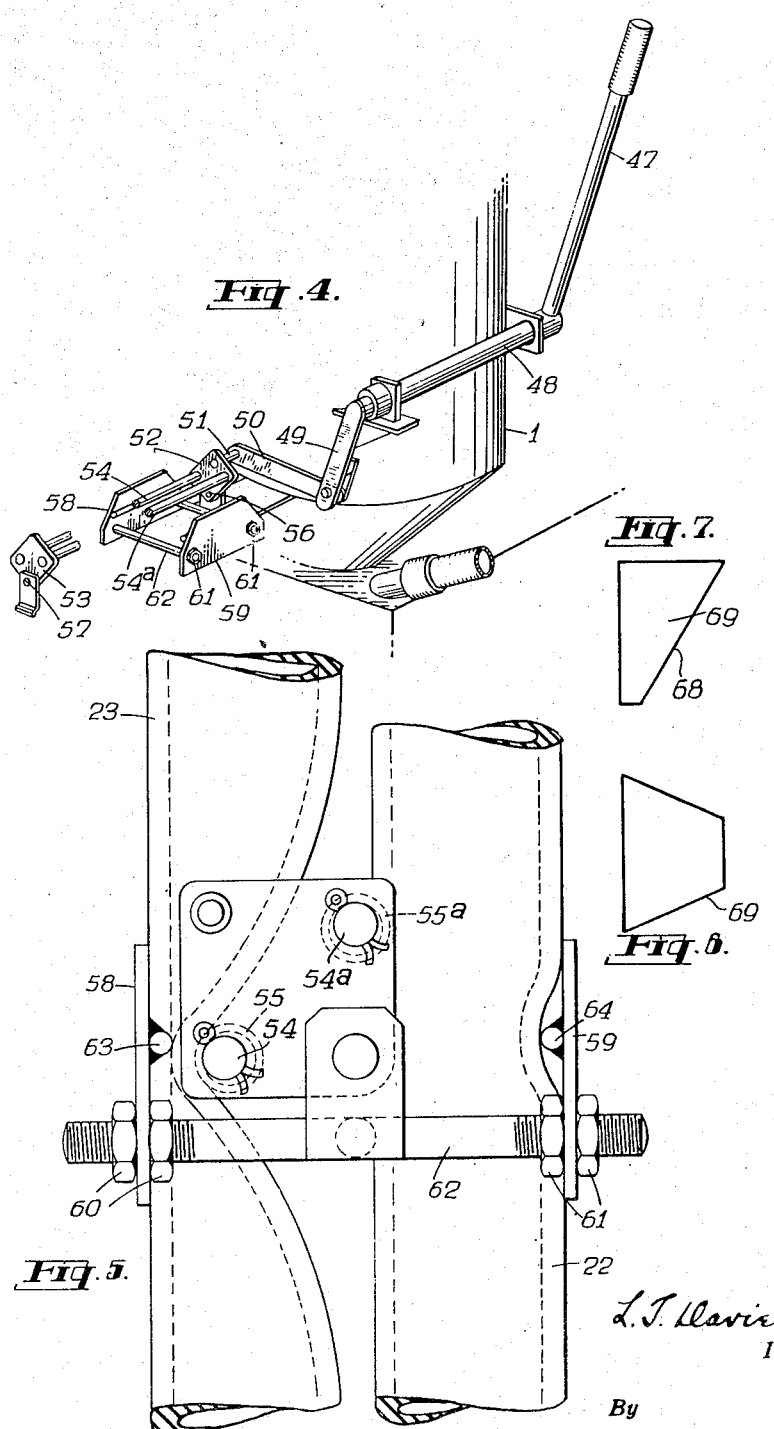
L. T. Davies
Inventor Patented Dec. 29, 1953

2,664,277

UNITED STATES PATENT OFFICE 2,664,277

CEMENT MIXER

Leonard Truman Davies, Higham, England, assignor to Colcrete Limited, Strood, England Application May 28, 1952, Serial No. 290,434

4 Claims. (Cl. 259—161)

The present invention relates to cement mixers for producing so-called "colloidal" cement-grout or concrete wherein the solid particles of cement or of cement and sand are thoroughly mixed with water so that they are more or less individually suspended in the water whereby largely to prevent subsequent sedimentation and to increase the apparent density of the mix.

A machine for this general purpose is disclosed in the patent granted J. S. Morgan et al. April 13, 1943, No. 2,316,705, of which the present invention is an improvement.

According to the present invention a cement mixing and pumping unit consisting of a rotor within a casing, is connected in closed circuit with a hopper having an inclined or conical bottom, so that the mixing and pumping unit can draw water and cement from the bottom of the hopper and discharge it to an upper region thereof in a more or less tangential direction to cause the mixture to flow around and down the side of the hopper in a somewhat vortical manner, and the hopper is provided with a deflector on the bottom thereof extending circumferentially and inwardly towards an outlet in the bottom whereby to direct the downwardly flowing mixture to the outlet and thus to keep the outlet full of the mixture and prevent the mixing unit from drawing air.

The hopper bottom may have a central outlet leading into a trap therebelow communicating directly with the mixing and pumping unit and the trap may be provided with a pipe connection to enable a charge of water to be fed into the trap prior to a mixing operation.

The trap may be of decreasing width in plan view in a direction proceeding away from the mixing and pumping unit and/or may be of downwardly decreasing length whereby the trap may be of relatively small volume and the mixer thus able to work with a relatively small water charge.

In machines of the present invention the mixture is passed in closed circuit through the mixing unit and down through the hopper and back to the mixing unit repeatedly at relatively high speed so as to ensure an intensive mixing of the solid material with the water to produce a colloidal mix.

The vortical flow of the mixture down the hopper assists in the assimilation of dry particles into the mix and tends to keep the flow of the mix on the sides of the hopper and this, but for the deflector, would permit the mixing unit to draw air intermittently which would give rise to surging and intermittent pumping.

The deflector however directs the mix towards the centre of the hopper bottom sufficiently to keep the outlet full whereby a high rate of pumping by the mixing unit can be maintained to achieve a maximum circulation of the mix through the mixing unit and thereby a high rate of production.

The mixing and pumping unit may have two alternative outlets, one leading to the upper part of the hopper and the other serving for the discharge of the mix from the hopper. These outlets may each include a flexible pipe section formed for example of rubber so that one or the other can be closed by flexure of the pipe section. For this purpose the flexible outlet pipe sections may be arranged side by side on opposite sides of an angularly displaceable presser device adapted to be moved into one terminal position or another in order to flex or close one or other of said flexible pipe connections.

Said presser device may consist of an angularly displaceable carrier such as a bracket or arm or a pair of brackets or arms supporting a roller or a pair of rollers adapted, on angular displacement of the carrier into one of its two terminal positions, to engage one or other of said flexible pipe connections to flex and close the same.

An adjustable abutment plate may be provided adjacent to each of said flexible pipe connections on that side thereof opposite to the pressure device and each of said plates may have a projection directed towards the presser device whereby to increase the effort required to force the presser device through its final movement into a terminal position and thus to lock the presser device in such terminal position.

The invention may be carried into practice either as a single hopper mixer or a double hopper mixer. In the case of a single hopper mixer the cement and water would be mixed first and the sand subsequently added to the cement and water mix. In the case of a double hopper mixer a charge of cement and water would first be thoroughly mixed in the first hopper and would then be discharged to the second hopper where the sand would be added and thoroughly mixed therewith.

The invention is further described with reference to the accompanying drawings in which:

Fig. 1 is a simplified diagrammatic view of a double hopper mixer.

Fig. 4 is a perspective view of a presser device for flexing and closing the flexible pipe sections and Fig. 5 is an end view to a larger scale of part of Fig. 4.

Figs. 6 and 7 are a diagrammatic plan and side elevation respectively of a preferred form of trap.

Figure 3:
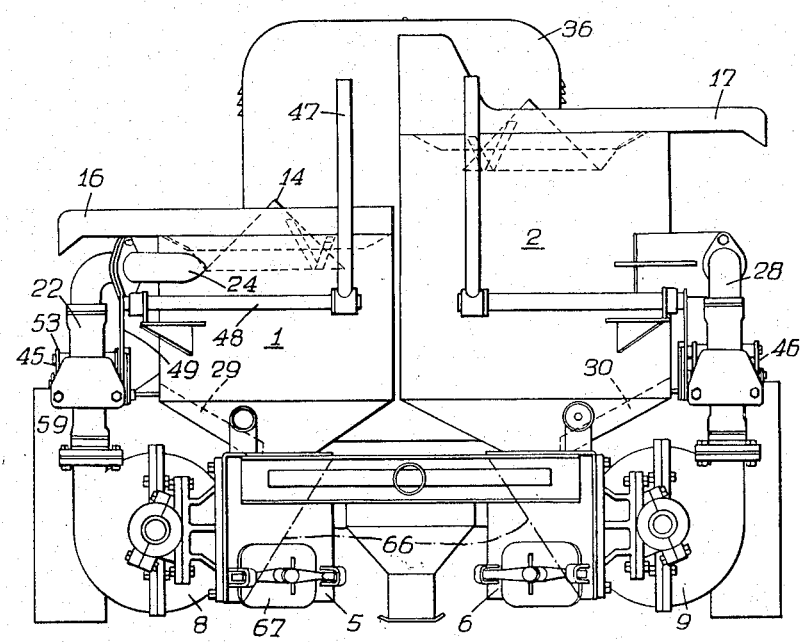
Fig. 3 is an end view corresponding to Fig. 2.

The arrangement which is diagrammatically illustrated in Fig. 1 embodies a cement mixing hopper 1 and a sand mixing hopper 2 each having a conical bottom 3,4 leading to a trap 5, 6. A pipe connection 7 leads into the trap 5 to enable a charge of water to be fed into trap 5. The pipe connection 7 may lead from a water measuring tank adapted to deliver a measured quantity of water to the trap 5 which in the arrangement shown in Fig. 1 is of downwardly decreasing cross section to enable the trap to be of relatively small volume.

The hopper 1 is provided with a mixing and pumping unit 8 and the hopper 2 with a mixing and pumping unit 9 each communicating directly with its trap 5 or 6. The mixing and pumping unit 8 consists of a rotatable disc 10 mounted with a relatively small side clearance within an enclosing casing 11 so that the side faces of the disc and casing whilst not in grinding contact with one another are in rapid relative motion whereby the particles of cement passing between said surfaces will be split off from one another and intimately mixed with the water. In the case of the pumping and mixing unit 9 the disc 10 is replaced by a paddle element or impellor 12 in the form more or less of a Maltese cross rotating within a casing 13 whereby to beat the ingredients into a state of relatively fine admixture so as to bring the solid particles into a state of suspension in the water.

A cone 14, 15 is provided at the mouth of each hopper 1, 2 for guiding the cement or sand towards the walls of the hopper when charged into the hopper. Each hopper is also provided with a tray 16, 17 having a circular opening 18, 19 to facilitate the charging operation.

The mixing and pumping unit has twin outlets 20, 21 connected through flexible pipes 22, 23 to a return pipe 24 and a transfer pipe 25. The return pipe 24 discharges more or less tangentially into the upper end of the hopper 1 whilst the transfer pipe 25 discharges more or less tangentially into the hopper 2. A roller 26 mounted upon an angularly displaceable arm 27 is adapted to flex and close one or other of the flexible pipes 22, 23.

The mixing and pumping unit 9 likewise has twin outlets leading through twin flexible pipes to a discharge pipe 28 and a return pipe 28a which discharges more or less tangentially into the hopper 2.

A more or less spiral deflector plate 29 on the conical bottom 3 of the hopper 1 extends circumferentially and inwardly from the side wall of the hopper 1. A similar deflector plate 30 is provided on the bottom 4 of the hopper 2. Each of these deflector plates is so placed on the hopper bottom as to lie behind its related return pipe 24, 28, i. e. so as to lie downstream thereof having regard to the direction of circumferential flow of the mix in the hopper.

In using the mixer according to the present invention a measured quantity of water is first introduced into the trap 5 beneath the hopper 1 and with the mixing and pumping unit 8 in motion cement is fed into the hopper over the distributor cone 14, 14 whereupon the cement is taken up with the water by the mixing unit and pumped around in closed circuit for a suitable length of time, say 15 or 30 seconds for a batch including 1 cwt. cement. The arm 27 is then angularly displaced to cause the roller 26 to open the flexible pipe 23 and close the flexible pipe 22 to cause the charge to pass through the transfer pipe 25 into the hopper 2. Sand is then fed into the hopper 2 over the distributor cone 15 and is taken up by the cement-water mix and pumped around in closed circuit through the return pipe 28a for a suitable period of time whereupon arm 31 and roller 32 are switched over to close the return pipe 28a and to open the discharge pipe 28 to discharge the mix from the hopper 2.

If desired only a single hopper may be employed, such for example as the hopper 2, in which event the trap 6 would be provided with a pipe connection 7 for feeding a water charge thereto and the transfer pipe 25 would of course be eliminated.

The tangential disposition of the pipes 24, 25, 28a in relation to the hoppers 1 and 2 are responsible for the vortical motion of the mixes down the hoppers. Whilst this vortical motion materially assists in the assimilation of dry particles into the mix it has the disadvantage that it tends to keep the flow of the mix on the sides of the hoppers and this but for the deflector plates 29, 30 would permit the mixing units 8, 9 to draw air intermittently. This would give rise to surging and intermittent pumping. The deflector plates 29, 30, however, deflect the mix to the centre of the hopper sufficiently to keep the outlets full whereby a high rate of pumping by the mixing units can be maintained to achieve a maximum circulation of the mix and thereby a high rate of production.

Figure 2:
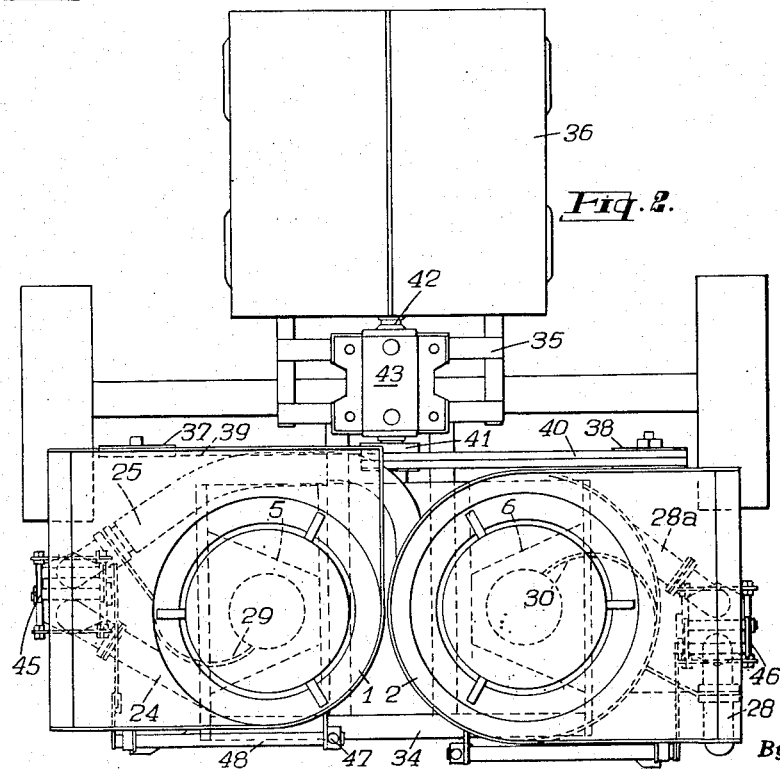
Fig. 2 is a plan view of an actual double hopper mixer mounted on a portable chassis with its power unit.

Figs. 2 and 3 illustrate an actual embodiment of the invention wherein the hoppers 1 and 2 are mounted on a portable chassis 34, 35 provided with an independent power unit 36 which in the embodiment shown consists of an internal combustion engine but which might equally well consist of a suitable electric motor.

The mixing units 8, 9, connected to the traps 5, 6 are driven respectively by pulleys 37, 38 driven through belts 39, 40 from a pair of pulleys 41 mounted on the shaft 42 of the engine 36. The shaft 42 is journalled in a bearing 43 mounted on the chassis 35. It will be noted particularly from Fig. 2 that the return pipe 24 enters the hopper 1 substantially tangentially and that the deflector plate 29 lies downstream in relation to the entrance of the return pipe 24 into the hopper 1. Similarly the deflector plate 30 of hopper 2 is arranged downstream in relation to the return pipe 28a, the direction of vortical flow in each case being counter-clockwise.

It will be noted from Figs. 2 and 3 that the side walls of the traps 5 and 6 converge in a direction away from the end wall through which they communicate with the mixing and pumping unit 8 or 9. In other words the traps are of decreasing width in plan away from the mixing and pumping unit. This reduces the volume of the traps and enables the mixer to work satisfactorily with a smaller water charge and thus enables mixes of less water content to be made.

Figs. 4 and 5 illustrate in more detail the presser devices 45 and 46 shown in Fig. 2 and will be explained with reference to the presser device 45 of Fig. 2 which lies between the flexible pipe sections 22, 23 (Fig. 1).

Referring to Fig. 4 a handle 47 is flexibly mounted on one end of a shaft 48 which runs horizontally behind the hopper 1 and at its other end has fixedly secured thereto a crank arm 49 which is pivoted to one end of a link 50 the other end of which is pivoted to a pin 51 projecting from one of a pair of angularly displaceable plates 52, 53 supporting a pair of rods 54, 54a on which are mounted rollers 55, 55a. The rollers 55, 55a are shown in Fig. 5 but are omitted from Fig. 4 which is drawn to a smaller scale. The plates 52, 53 are pivoted at 56, 57. The presser device lies between two adjustable abutment plates 58, 59 which lie adjacent the faces of the adjustable pipe sections 22, 23 opposite to the presser device. The positions of the abutment plates 58, 59 can be adjusted by nuts 60, 61 mounted on threaded rods 62. Each of the plates 58, 59 is provided on its inner side i. e. on that side thereof facing the presser device, with a projection 63, 64 in the form of a tube or bar welded to the abutment plate.

In Fig. 4 the presser device is shown intermediate of its terminal positions but is shown in one of its terminal positions in Fig. 5. In this position it has flexed and closed the flexible pipe element 23 by engagement of the roller 55 with the pipe section 23. By clockwise movement of the presser device into the opposite terminal position as viewed in Fig. 5 the roller 55 will release the flexible pipe section 23 and the roller 55a will flex and close the flexible pipe section 22.

It will be observed that as each roller 55, 55a moves into its terminal position it is obliged to pass the abutment 63 or 64. An increased effort is thus required to move the presser device into its terminal position and this serves to lock the presser device in such terminal position until forcibly withdrawn from such position by the arm 47.

It will be noted that whilst the traps 5, 6 of Fig. 1 are of downwardly decreasing length, those of Figs. 2 and 3 are of decreasing width in a direction proceeding away from the mixing and pumping unit. If desired one or both of the traps 5, 6 may be of downwardly decreasing length and also of decreasing width as diagrammatically shown in Figs. 6 and 7 and as indicated by the dotted lines 66 in Fig. 3.

The traps 5, 6 of Figs. 2 and 3 have cleaning doors 67.

In a single hopper machine having a trap according to Figs. 6 and 7, the cleaning door is preferably provided on the face 68 whilst in the case of a double hopper machine it is preferable to provide a relatively deep and narrow door on the face 69 (Figs. 6 and 7).

I claim:

1. A cement mixer embodying a hopper having a bottom which is inclined towards an outlet therefrom and having near its upper end a more or less tangentially directed inlet, a trap beneath the outlet of the hopper, a mixing and pumping unit consisting of a casing with a rotor therein, said unit being mounted on and communicating on its inlet side with the trap and the casing of said unit having two alternative outlets, flexible outlet pipes connected to said outlets of which one leads to the inlet to the hopper and an angularly displaceable presser device located between said flexible outlet pipes adapted to move from one terminal position to another in order to flex and close one or other of said outlet pipes.

2. A cement mixer embodying a first hopper and a second hopper each having an inclined bottom with a central outlet therefrom, said first hopper having near the upper end thereof a more or less tangentially directed inlet and said second hopper having two inlets spaced from one another but delivering tangentially in the same rotational direction, a deflector on the bottom of each hopper extending circumferentially and inwardly towards the outlet in the bottom in a direction which is rotationally the same as the direction of the inlet or inlets of the hoppers, a trap located immediately beneath the outlet of each hopper, a mixing and pumping unit mounted on and communicating at its inlet side with the first trap and consisting of a casing with a rotor therein in the form of a circular disc, a second mixing and pumping unit mounted on and communicating at its inlet side with the second trap and consisting of a casing with a rotor therein in the form of a swastika-like paddle, the casings of said mixing and pumping units each having two alternative outlets, flexible pipe connections leading from the outlets of the first mixing and pumping unit connected respectively to the inlet of the first hopper and to one of the inlets of the second hopper, flexible pipe connections leading from the outlets of the second mixing and pumping unit of which one leads to the second inlet of the second hopper and a presser device located between the flexible connections of each mixing and pumping unit to enable one or other of each two connections to be flexed and closed.

3. In combination, a pump discharge having two adjacent parallel outlet pipes of flexible material, a pressure sustaining element, outwardly of each pipe, an angularly displaceable presser device located between said pipes between said pressure sustaining elements, said device including a pair of spaced pivoted plates, a pair of parallel rollers between the plates and a link for rocking the plates to bring one of said rollers into compressive relation to one of said pipes whereby to compress said pipe against the pressure sustaining element adjacent thereto.

4. In combination, a pump discharge having two adjacent parallel outlet pipes of flexible material, an adjustable plate outwardly of each pipe, an abutment on each plate, an angularly displaceable presser device located between said pipes, said device including a pair of spaced pivoted plates, a pair of parallel rollers between the plates and a link for rocking the plates to bring one of said rollers into a locking compressive position against one of said pipes and past one of said abutments.

LEONARD TRUMAN DAVIES.

References Cited in the file of this patent

UNITED STATES PATENTS

| Number | Name | Date |
| --- | --- | --- |
| 1,127,660 | McMichael | Feb. 6, 1915 |
| 1,563,200 | Leichnam | Nov. 24, 1925 |
| 2,041,207 | Rietz | May 19, 1936 |
| 2,263,498 | Howard | Nov. 18, 1941 |
| 2,316,705 | Morgan et al. | Apr. 13, 1943 |
| 2,577,095 | Walker | Dec. 4, 1951 |